(12) United States Patent
Rohner et al.

(10) Patent No.: US 7,800,739 B2
(45) Date of Patent: Sep. 21, 2010

(54) DISTANCE MEASURING METHOD AND DISTANCE MEASURING ELEMENT FOR DETECTING THE SPATIAL DIMENSION OF A TARGET

(75) Inventors: Marcel Rohner, Heiden (CH); Beat Aebischer, Heerbrugg (CH); Thomas Jensen, Rorschach (CH); Knut Siercks, St. Gallen (CH)

(73) Assignee: Leica Geosystems AG, Heerbrugg (CH)

( * ) Notice: Subject to any disclaimer, the term of this patent is extended or adjusted under 35 U.S.C. 154(b) by 157 days.

(21) Appl. No.: 12/301,025

(22) PCT Filed: May 11, 2007

(86) PCT No.: PCT/EP2007/004176

§ 371 (c)(1),
(2), (4) Date: Nov. 19, 2008

(87) PCT Pub. No.: WO2007/134730

PCT Pub. Date: Nov. 29, 2007

(65) Prior Publication Data

US 2009/0185159 A1 Jul. 23, 2009

(30) Foreign Application Priority Data

May 23, 2006 (EP) .................................. 06114399

(51) Int. Cl.
*G01C 3/08* (2006.01)
(52) U.S. Cl. ..................................... 356/5.03; 356/5.01
(58) Field of Classification Search ................ 356/4.01, 356/5.01, 5.03–5.08, 141.5
See application file for complete search history.

(56) References Cited

U.S. PATENT DOCUMENTS

| 4,816,669 | A | 3/1989 | Andersen |
| 5,892,575 | A | 4/1999 | Marino |
| 6,115,112 | A | 9/2000 | Hertzman et al. |
| 6,466,307 | B2 * | 10/2002 | Chien et al. ................ 356/5.03 |
| 6,535,275 | B2 | 3/2003 | McCaffrey et al. |
| 7,193,692 | B2 * | 3/2007 | Huang ....................... 356/5.08 |
| 7,477,361 | B2 * | 1/2009 | Murayama ................. 356/4.01 |
| 7,518,709 | B2 * | 4/2009 | Oishi et al. ................ 356/4.01 |
| 7,643,131 | B2 * | 1/2010 | Tsunesada et al. ......... 356/4.07 |
| 2009/0141262 | A1 * | 6/2009 | Rothman et al. ........... 356/5.01 |

FOREIGN PATENT DOCUMENTS

EP 0703465 A2 3/1996

OTHER PUBLICATIONS

Niclass, Cristiano et al: A CMOS 3D Camera With Millimetric Depth Resolution; Swiss Federal Institute of Technology, Lausanne, Switzerland; IEEE Oct. 3, 2004 pp. 705-708, XP010742419.

* cited by examiner

*Primary Examiner*—Isam Alsomiri
(74) *Attorney, Agent, or Firm*—Workman Nydegger

(57) ABSTRACT

A distance measuring method for detecting the spatial dimension of at least one target by at least one emission of a multiplicity of light pulses, in particular laser light, towards the target, detecting the light pulse scattered back by the target by means of a multiplicity of distance measuring pixels and eliminating the distance to the target for each pixel, wherein each light pulse can be detected within a measuring interval Ti from at least two partial intervals tij and the detection of at least one repetition constitutes a detection step performed in at least two stages wherein the measuring interval T~ is shortened from stage to stage.

22 Claims, 3 Drawing Sheets

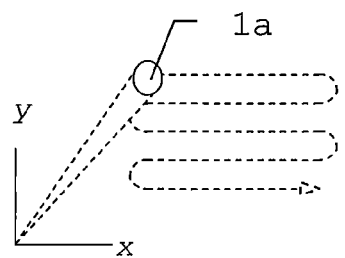
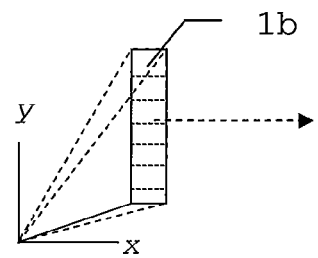
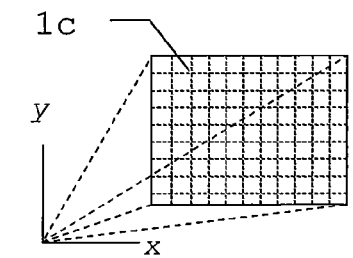
Fig. 1a          Fig. 1b          Fig. 1c
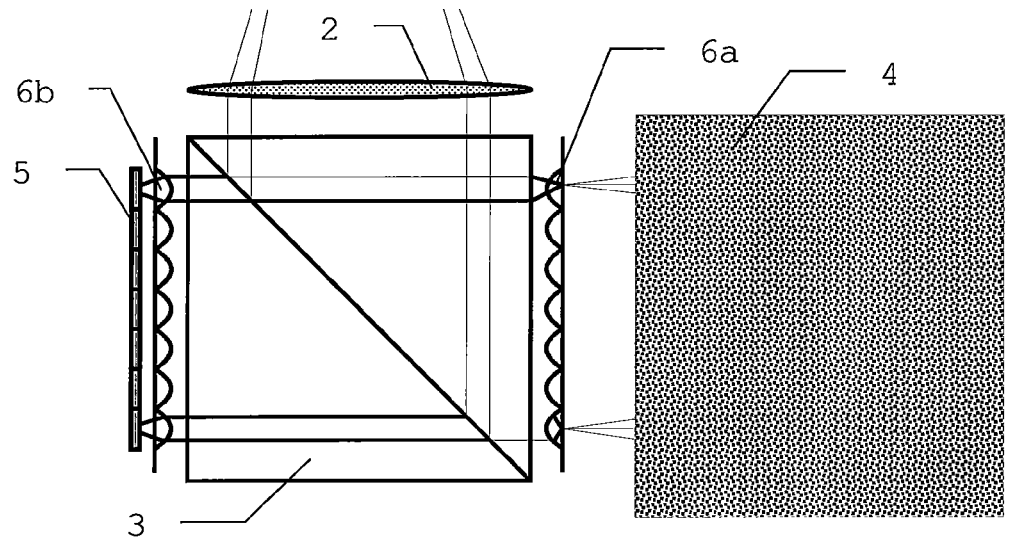
Fig. 2
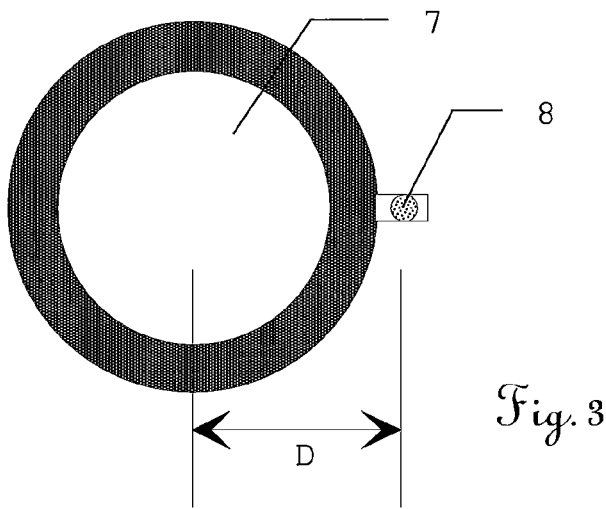
Fig. 3

DISTANCE MEASURING METHOD AND DISTANCE MEASURING ELEMENT FOR DETECTING THE SPATIAL DIMENSION OF A TARGET

BACKGROUND OF THE INVENTION

The invention relates to a distance-measuring method for determining the spatial dimension of at least one target and a corresponding rangefinder.

A multiplicity of measuring apparatuses have been known since antiquity for recording properties of defined points in a measuring environment, in particular of data having a spatial reference. The location of a measuring device together with any reference points present, and direction, distance and angle to targets and measuring points, are recorded as standard spatial data.

A generally known example of such measuring apparatuses is the theodolite. In the two-dimensional representation of the optical image, it is possible to specify points to which a measurement, i.e. the determination of distance and/or angle, is effected. On the basis of the image, targets can be identified and tracked by image processing methods, so that automated surveying on this basis is in principle possible.

However, this image has no depth information at all, so that the image processing methods are dependent on corresponding prior information, image recording conditions, such as, for example, the preorientation of a target plate, or image properties, such as, for example, brightness and contrast. The possibilities of target identification and target tracking are limited by the purely visual detection. In particular, it is not possible to resolve optical ambiguities as occur, for example, in the case of curved surfaces. Thus, a disc and a sphere may appear as an identical image in both cases in a frontal photograph under unfavourable light conditions.

In many applications, however, additional information about the spatial extension of objects is also relevant, not only individual selected points but the extensive form of the object being of interest. This applies, for example, to safety technology where, together with object detection, object recognition is often also required in order to initiate suitable safety measures. Further applications are in the industrial sector, for example in quality control in manufacture and in vehicle safety technology.

In the prior art there are various approaches to the determination of the spatial dimensions or the form of objects. For distance measurement, a generally optical signal is directed from the measuring system in the direction of the object to be surveyed and a part of the light reflected by the object is detected by the optical sensors of the measuring system and processed. From the phase shift or the signal transit time from the optical source of the measuring system to the object and back to the sensors, conclusions can be drawn about the distance of the respective measured point.

For this purpose, the distance to a plurality of points of the object is measured sequentially or simultaneously with the aid of an individual rangefinder moved in a scanning manner with respect to the beam path or a multiplicity of rangefinders which are arranged in a line or in an array or in another geometry adapted to the application, so that the object geometry can be reconstructed from the measured data obtained.

Systems using a scanning beam have disadvantages which result from the mechanical design. Either the total device must be moved over the visual area to be recorded or the beam guidance must be made variable with otherwise invariable apparatus. In addition to the cost for such mechanically and/or optically demanding or complex solutions, they mostly have only a low scanning speed and moreover possess a comparatively high energy consumption. Owing to the scanning movement and mechanical loads, for example due to vibrations, the correlation of the distance measurements with the image points of the visual image cannot be ensured or can be ensured only at additional cost.

Parallel data recording, i.e. the simultaneous measurement to a plurality of measured points or many measured points, is based on simultaneously carrying out a plurality of measuring processes, which also requires the duplication of components, for example by the use of a plurality of rangefinders. Advantageous solutions make use of integration of the sensors in an ASIC, permitting lower assembly cost of the system components and optimised manufacture.

The parallel approach can also be supported by a scanning mechanism, with the result that the lateral point density can be increased, or which also makes it possible to scan an object in all spatial dimensions using a linear arrangement of the sensors. This mechanism can be carried out, for example, on an electro-optical beam deflection, a mechanical beam deflection by means of mirrors or a manual beam deflection in combination with an inertial sensor for direction determination.

By parallelizing the measurement, the light source has to meet higher requirements compared with a single point measurement if, for example, comparable requirements regarding the measuring range and the uncertainty of measurement are assumed. In addition, a high degree of parallelizing can be expediently achieved technically only with a measurement concept whose realisation involves little complexity.

For example, the approach disclosed in DE 44 40 613 uses sinusoidally modulated light emitted by LEDs for distance measurement. The sensors arranged in an array scan the light reflected by the object with at least four scanning times. The phase difference between emitted optical signal and optical signal reflected by the object is determined from these by simple arithmetic. The phase is calculated after reading out the scanning values outside the sensor array. With a knowledge of the wavelength of the light modulation, the distance to the measured point can be derived from the measured phase.

By limitation to a few scanning points and dispensing with calculations in the sensors, these have little complexity. However, rangefinders with sinusoidally modulated light have poor sensitivity, which limits the use of the system to nearby objects or a low degree of parallelizing.

Similarly, in DE 197 04 496, the relative phase of a back-scattered signal is determined relative to the phase of a sinusoidally modulated light signal by detection with so-called photonic mixer devices. Here, the light sensor produces demodulation of the light received. By using this demodulation in various phase relationships between the emitted light signal and the demodulation signal, the phase between the emitted light signal and the received light signal, and hence the distance to the object, can be determined. Once again, poor sensitivity is achieved by the use of sinusoidally modulated light.

Brian Aull, "3D *Imaging with Geiger-mode Avalanche Photodiodes*", Optics & Photonics News, May 2005, pp. 42ff, discloses a concept which uses pulsed light emitted by a laser for distance measurement. The back-scattered photons are detected as light-sensitive elements in single-photon detectors. The time of arrival of these photons is the measure for the distance to the respective object point. This time of arrival is determined by stopping a fast digital counter or a plurality of phase-shifted counters on detection of the photon. These counters have a relatively low degree of complexity. In addition, the measurement is very sensitive owing to the use of pulsed light. However, digital counters achieve poor resolution, which is determined by the clock interval. The method is therefore unsuitable for precision measurements.

C. Niclass, A. Rochas, P. A. Besse, E. Charbon, "*A CMOS 3D Camera with Millimetric Depth Resolution*", *IEEE Custom Integrated Circuits Conference*, pp. 705-708, October 2004, discloses a similar method. However, a higher time resolution is achieved by using time-to-digital converters (TDC) which interpolate the photon arrival time within the clock interval. However, the high complexity of the TDC does not permit the use of a dedicated TDC for each sensor element. An individual TDC therefore detects the time of arrival of the first photon of a larger quantity of photons detected by sensors. All subsequently detected photons cannot be detected by the TDC and are therefore lost. This constitutes considerable limitation for the sensitivity of the system.

U.S. Pat. No. 6,115,112 describes a distance measuring instrument which determines the time-of-flight of pulsed laser light in order to derive the distance to an object point. Measurement is divided into a coarse measurement and into a fine measurement. During the coarse measurement, strong optical pulses are emitted so that the signal reflected back by the object and received is clearly distinguished from the existing noise. In the coarse measurement, the distance to the object point is roughly determined. In the subsequent fine measurement, the measuring signal—or a measuring product derived therefrom—in the vicinity of the time determined during the coarse measurement is scanned and further processed.

The method is not suitable for parallelized measurement using a plurality of sensors, since the requirement that the back-scattered signal differs clearly from the noise during the coarse measurement is achievable in practice only with great pulse energies and hence very complicated optical sources.

SUMMARY OF THE INVENTION

The object of the present invention is to provide an improved method and such an apparatus for the spatial surveying of objects, in particular for surveying over relatively large distances and with increased accuracy.

A further object is to provide a rangefinder comprising a multiplicity of distance-measuring components of low complexity.

These objects are achieved, according to the invention, by the subjects of Claims 1 and 8 and by the features of the subclaims or the solutions are developed.

The invention is based on the shortening of the time interval used for the measurement from stage to stage with a simultaneously constant number of part-intervals $t_{i,j}$.

In the realisation form described here by way of example, for the measurement of the distance to individual points on the surface of an object to be surveyed, electromagnetic radiation, preferably laser light, in pulse form is emitted towards this object. The reflected light is received again and its time-related characteristic is evaluated for determining the transit time of the pulse. The time of the receipt of the reflected pulse is determined on the basis of the identification of the position of the signal flank as a function of time. For this purpose, the receiver registers the radiation incident within a measuring interval, the measuring interval being set while taking into account the pulse shape and pulse duration with respect to duration of interval and positioning as a function of time, so that unambiguity is ensured in the pulse identification. For deriving this time, the measuring interval $T_i$ is divided into a plurality of part-intervals $t_{i,j}$ and the input of the pulse is coordinated with one or more of the part-intervals $t_{i,j}$.

According to the invention, the determination of the distance to a measured point is effected in a plurality of stages or phases $P_i$, the accuracy of the distance measurement being gradually increased by changing the time parameters.

With regard to apparatus, each sensor has for this purpose a number of M memories, which are designated here by $M_j$, j=1 . . . M, it being possible, according to the invention, for these to be both analogue and digital memories. The number of memories can be chosen to be relatively small—for example M=5—in order also to keep the complexity of a sensor element low. A part-interval $t_{i,j}$ of the total measuring interval $T_i$ is dynamically coordinated with each of these memories, the part-intervals $t_{i,j}$ being chosen in principle with equal duration. However, according to the invention, part-intervals $t_{i,j}$ of different duration can also be realised within the measuring interval $T_i$. An optical source emits light pulses which may have, for example, a maximum pulse duration corresponding to that of one of the part-intervals $t_{i,j}$, it being possible to increase the pulse repetition rate on shortening the measuring interval $T_i$. Each memory integrates the light intensity back-scattered by the object and collected by an optical system, during the time interval coordinated with it, so that each memory represents the light energy received during its part-interval $t_{i,j}$. This measurement of the light energy can also be effected several times within a phase if the signal-to-noise ratio of the received signal requires this. The number of repetitions can also be adapted to the measurement conditions in order thus to optimise the measuring rate within the specified accuracies of measurement.

After the end of the stage $P_i$, that memory element $M_{max}$ which has accumulated the greatest quantity of light energy, for example $M_3$, is determined. The total measuring interval $T_{i+1}$ for the subsequent stage $P_{i+1}$ is then reduced to the duration of the part-intervals $t_{i,max-1}$ and $t_{i,max}$ or $t_{i,2}$ and $t_{i,3}$, which were coordinated with the memories $M_{max-1}$ and $M_{max}$ during stage $P_i$. By this increasing reduction of the measuring interval, the position of the optical signal as a function of time is known with increasing accuracy.

In the last stage $P_E$, the content of the memories $M_1$-$M_M$ constitutes scanning points of the optical signal, which, even with a suitable algorithm outside the sensor arrangement, permit the determination of the pulse position as a function of time with higher resolution than corresponds to the measuring intervals.

It may be advantageous to adapt the form of transmission of the emitted light to the length of the measuring intervals. As already described, for example, the duration of the light emission is chosen to be equal to the length of the measuring intervals coordinated with the memories. Moreover, the pulse repetition rate may be increased on reducing the measuring interval, without producing unambiguity problems. Likewise, the measuring time can be adapted to the prevailing signal conditions.

For each pulse emitted, conventional linear rangefinders usually receive a multiplicity of signal photons. Ideally, the number N of photons is sufficiently large to enable the noise of the distance measurements to be sufficiently small.

In the case of single-photon detectors or SPAD detectors, only a single photon is detected per pulse, but this limitation can also be circumvented if the detector is operated in a situation-dependent manner in the linear mode, which, however, means an increased technical effort.

As described in M. Rohner et al., "*Single-Photon Detection for High Precision Ranging—A Trade-Off Study*", *First Range Image Research Day* 2005, ETH Zurich, Switzerland, the probability of detecting an early proton is higher than the probability of registering a late proton if a plurality of protons reach the detector. Thus, owing to both the background photons and the signal photons, signal distortions may occur. For a Gaussian optical pulse of total energy $Q_r$, a pulse length $\sigma_p$ (FWHM=2.355·$\sigma_p$) and an arrival rate E of the background photons as intensity of the background light, it follows that the total density of the incoming photons is $$r(t) = \frac{I(t)}{h\nu} = \frac{Q_r}{h\nu} \frac{1}{\sqrt{2\pi} \cdot \sigma_p} e^{-(t-\tau)^2/(2\sigma_p^2)} + E \quad (1)$$

This results in a probability of detection of $$P_n(t; r(t)) = \exp\left(-\frac{1}{2}\frac{\eta_0 \cdot Q_r}{h\nu}\left[\text{erf}\left(\frac{t-\tau}{\sqrt{2} \cdot \sigma_p}\right) + 1\right] - t \cdot \eta_0 \cdot E\right) \quad (2)$$

where, for the sake of simplicity, $$-\text{erf}\left(\frac{-\tau}{\sqrt{2} \cdot \sigma_p}\right)$$

can be replaced by 1, which is true to a good approximation for $\tau \gg \sigma_p$. Equation (2) is therefore a mathematical signal model for the variation of the detected signal as a function of lag time $\tau$, pulse energy $Q_r$, pulse length $\sigma_p$, intensity of the background light E, detection quantum efficiency $\eta_0$, and single-photon energy $h\nu$. The detected signal follows the original signal curve in equation (1) only for small values of $Q_r$ and E. For high accuracy requirements, it is therefore essential to determine the lag time $\tau$ taking into account the signal distortions in equation (2). This can be achieved, for example, by solving a non linear optimisation problem. Here, the pulse length $\sigma_p$ is typically assumed to be determined by a system identification. The pulse energy $Q_r$ is estimated as a "nuisance parameter" together with the lag time $\tau$, while the intensity of the background light, E, is determined either by estimation in the signal model (2) or by a separate measurement. Instead of the three parameters $Q_r$, E, $\eta_0$, the two combinations $\eta_0 \cdot Q_r/(h\nu)$ and $\eta_0 \cdot E$ can also be determined directly.

The probability density (2) cannot be determined directly. The mean value of the memory cells is obtained by integration of (2) over the corresponding measuring intervals.

In order to minimise measurement errors through erroneous estimated values of $\sigma_p$ and E, it is advantageous to centre the reflected pulse in the total measuring interval in the last measuring phase. This can be effected by interpolation of the last detection phase or by an additional measuring phase.

If background radiation is present during the measuring process, this too is detected as noise. If the measuring interval is chosen to be sufficiently long compared with the background radiation, the memory value of the memory M in whose time interval the measured signal is also detected increases above the memory values of the other memories M. With the knowledge of the storage period compared with the transmission time of the measured signal, this permits a simple transit time determination of the measured signal. With the transit time of the measured signal determined in this manner and a knowledge of the propagation speed of the measured signal over the measuring distance, the distance to the measured object can be determined according to the elementary relationship R=c·$\tau$/2.

In contrast to the first working example, analogue memories, i.e. charge integrators, can be used in the case of linear detectors—such as, for example, PIN photodiodes, avalanche photodetectors or photogates. An advantageous embodiment uses the photogate and charge transfer technology as described, for example, in DE 44 40 613.

A second working example in the form of analogue technology functions in a manner similar to the first embodiment, the single-photon detector being replaced by a linear detector and the digital memory cells being replaced by analogue memories having corresponding read-out possibilities.

BRIEF DESCRIPTION OF THE DRAWINGS

The method according to the invention and a rangefinder according to the invention are described in more detail and explained below, purely by way of example, with reference to working examples shown schematically in the drawing. Specifically, FIG. 1a-c show the diagram of approaches of the prior art for determining the spatial dimensions or form of objects;

FIG. 2 shows the diagram of a first variant for realising the object illumination for a rangefinder according to the invention;

FIG. 3 shows the diagram of a second variant for realising the object illumination for a rangefinder according to the invention;

DETAILED DESCRIPTION OF THE DRAWINGS

Figure 4:
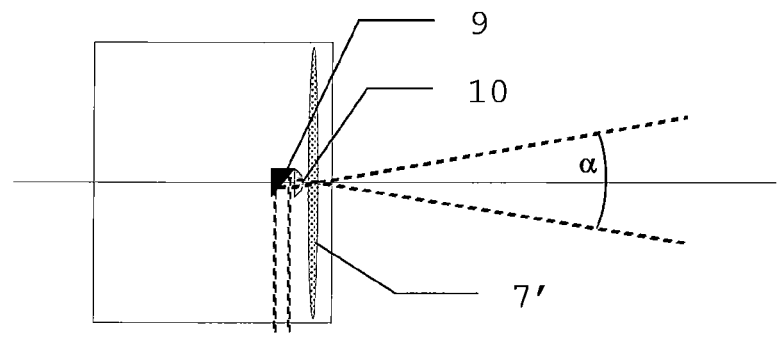
FIG. 4 shows the diagram of a third variant for realising the object illumination for a rangefinder according to the invention.

FIG. 1a-c explain approaches of the prior art for determining the spatial dimensions or form of objects. For scanning the surface of an object, multiple beam paths to the many different points of the surface must be realised.

These can—as shown in FIG. 1a—be achieved by the scanning movement of a single beam path having an aperture 1a which simultaneously detects in each case only a single point. The coverage of the object is completely sequential. For this purpose, an optical signal—for example generated by a laser—is guided by a scanning mechanism over the object and suitably shaped by a transmitter optical system. A part of the light reflected by the object is received by the aperture 1a of a receiving optical system and guided to the optical sensors of the measuring system. From the signal transit time from the optical source of the measuring system to the object and back to the sensors, the distance of the respective measured point can be derived. By synchronisation of the distance measurement with the position of the scanner, a reconstruction of the object in three dimensions can be achieved. An integrated system for imaging and modelling three-dimensional objects according to this principle is disclosed, for example, in WO 97/40342.

The requirements regarding a scanning system with movement or change of the beam path can be greatly reduced by parallelization of the distance measurement. In one approach, the entire scanning mechanism is eliminated, so that there is a positive effect on system costs, weight, reliability and measuring speed. A completely parallelized system then carries out a distance measurement simultaneously for all pixels, i.e.

the total distance information is recorded simultaneously. This situation is shown in FIG. 1c. Here, the total detection range of the system is covered by the individual apertures 1c of the pixels.

Between the completely sequential and the completely parallel approach, it is possible to realise various degrees of parallelization, as shown by way of example in FIG. 1b for the case of a scanning system comprising a moving line of sensors with coordinated detection regions 1b. The apparatus according to the invention and the method according to the invention relate in particular to the case of a linear or array-like sensor arrangement but, according to the invention, other embodiments of parallel or partly parallel systems, such as, for example, hexagonal structures, or coarse-fine structures, can also be realised.

In real systems, there are various time drift effects which increase the uncertainty of measurement of the distance measurement. This can be caused, for example, by time- and temperature-variant signal transmission properties of the laser or the detectors. For accurate measurements in the mm range, a parallel or sufficiently frequently repeated zero point calibration during and/or before the measurement is therefore advantageous. Typically, such a calibration is achieved by measurement to a reference target. For the linear scanner, this can be achieved by a reference target at a defined scanner position or by switching the optical paths. In the case of an extensive arrangement of the detectors, switching of the optical paths to a reference target is possible.

According to the invention, electromagnetic measuring radiation must be provided for a multiplicity of detectors, which radiation can be received by said detectors. In principle, each detector may have a separate radiation source or a common radiation source can be used for a plurality of sensors or pixels or all sensors or pixels. FIG. 2-4 show different alternative realisations for target illumination with only a single radiation source for all sensors. In contrast to classical laser-based rangefinders with an optical beam having an approximately point-like cross-section, the beam cross-section is fanned out here to give a line or an area. This can firstly be carried out to cover an area so that the lateral resolution is defined by mapping the photosensitive area onto the object. Secondly, the emitted light may also be in the form of a line or array of optical beams having an approximately point-like cross-section. In this case, the lateral resolution is typically defined by the transmitter and not by the detectors. The fundamental optical architecture is comparable with that of classical non-parallelized rangefinders.

FIG. 2 illustrates a first variant for realising the object illumination for a rangefinder according to the invention with direct coupling of transmitted and received beams. The measuring radiation generated by a radiation source is emitted via a lens 2, a beam splitter 3 and a first micro lens array 6a to the target 4 to be surveyed. The back-scattered measuring radiation is guided via the first micro lens array 6a and a second micro lens array 6b onto the sensors of the pixels 5. As a result of this design, a separate beam path for emission and reception is coordinated with each sensor or pixel 5, it being possible to eliminate parasitic reflections at the optical transitions by time-gating.

FIG. 3 shows a second variant for realising the object illumination for a rangefinder according to the invention, comprising biaxial design and off-axis illumination. The beam source is now arranged with its transmission optical system 8 in a biaxial arrangement with an axial spacing D adjacent to a lens 7 as an optical receiving opening of the pixel arrangement. By means of the radiation source separated from the receiving beam path, the target to be surveyed is illuminated so that the radiation detected by the lens 7 can be guided onto all pixels.

FIG. 4 shows a third variant for realising the object illumination with coaxial design. The measuring radiation generated by the radiation source is emitted via a deflection element 9, arranged in the receiver axis, and a transmission optical system 10 onto the target to be surveyed. Through the choice of a suitable opening angle $\alpha$, e.g. of 15°, it is ensured that the detection region of the sensors, which is defined by the lens 7' as an optical receiving opening, can be completely illuminated.

Figure 5:
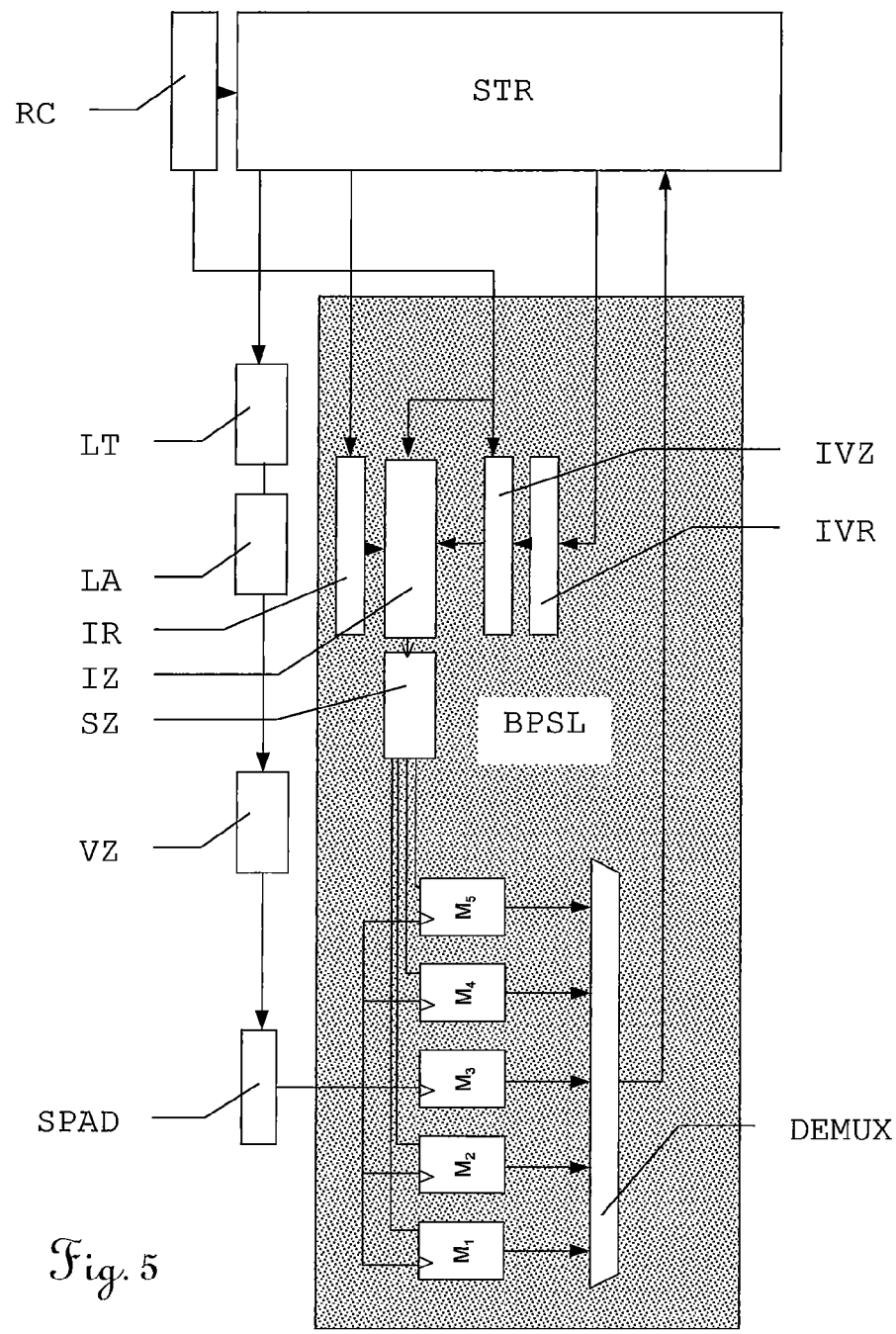
FIG. 5 shows a block diagram for a working example of a rangefinder according to the invention and FIG. 6 shows the diagram representing the choice of measuring intervals and part-intervals for a working example of a method according to the invention.

In FIG. 5, a working example of a rangefinder according to the invention is explained with reference to an exemplary block diagram. A laser diode LA actuated by a control logic system STR via a laser driver LT emits a multiplicity of laser pulses via a delay line VZ to a photosensitive element. The delay line VZ is defined by the distance from the laser diode LA to a target to be surveyed and back to the photosensitive element. Laser diode LA is actuated so that the light pulses generated are variable in pulse shape and/or duration.

In this working example, the photosensitive element used is an arrangement of distance-measuring pixels with single-photon detector SPAD for detecting the light pulses scattered back by the target. At each detection of a photon, said single-photon detector SPAD generates, as an electrical output signal, a characteristic curve, e.g. an ascending flank, which represents the trigger signal for M digital counters in the pixel control logic system BPSL for deriving a distance to the target for each of the pixels, in particular according to the pulse transit time principle. In the pixel control logic system BPSL, these counters are formed by memory cells $M_1$-$M_5$ whose memory contents are a measure of the detected light energy within the associated part-intervals. In each case at least two memory cells—here by way of example five memory cells $M_1$-$M_5$, are coordinated with each pixel, which memory cells each detect a partial time interval $t_{i,j}$, so that a measuring interval $T_i$ is covered with respect to time. The memory cells $M_1$-$M_5$ are connected so that the detection takes place in at least two stages, the measuring interval $T_i$ being shortened from stage to stage. For this purpose, a memory counter SZ selects the memory cell $M_1$-$M_5$ associated with the respective time interval. The memory counter SZ in turn is incremented—i.e. the subsequent memory cell is addressed—as soon as the interval counter IZ actuated by a central reference clock RC has completed a number of reference cycles which is determined by the interval length register IR.

The interval delay counter IVZ delays the activation of the first memory cell $M_1$ relative to the time of light emission by the value of the interval delay register IVR. This permits the arbitrary placing of the measuring interval of stage $P_j$ as a function of time relative to the pulse emission time. The content of interval register IR and the interval delay register IVR is reset after each measuring phase by the control logic system STR on the basis of the contents of the memory cells $M_1$-$M_5$ which are read out via a demultiplexer DEMUX. The control logic system STR can also be formed for the determination of the position of a detected light pulse as function of time by interpolation.

An imaging optical system can be integrated in the delay line VZ, the optical receiving path of which imaging optical system can be adapted automatically by means of an adjustable pupil adjustment to the distance to the target in order to achieve, on average over all pixels, an optimised detectable radiation intensity, or the depth of focus of which can be adapted to the distance to the target for minimising the crosstalk between the pixels.

Figure 6:
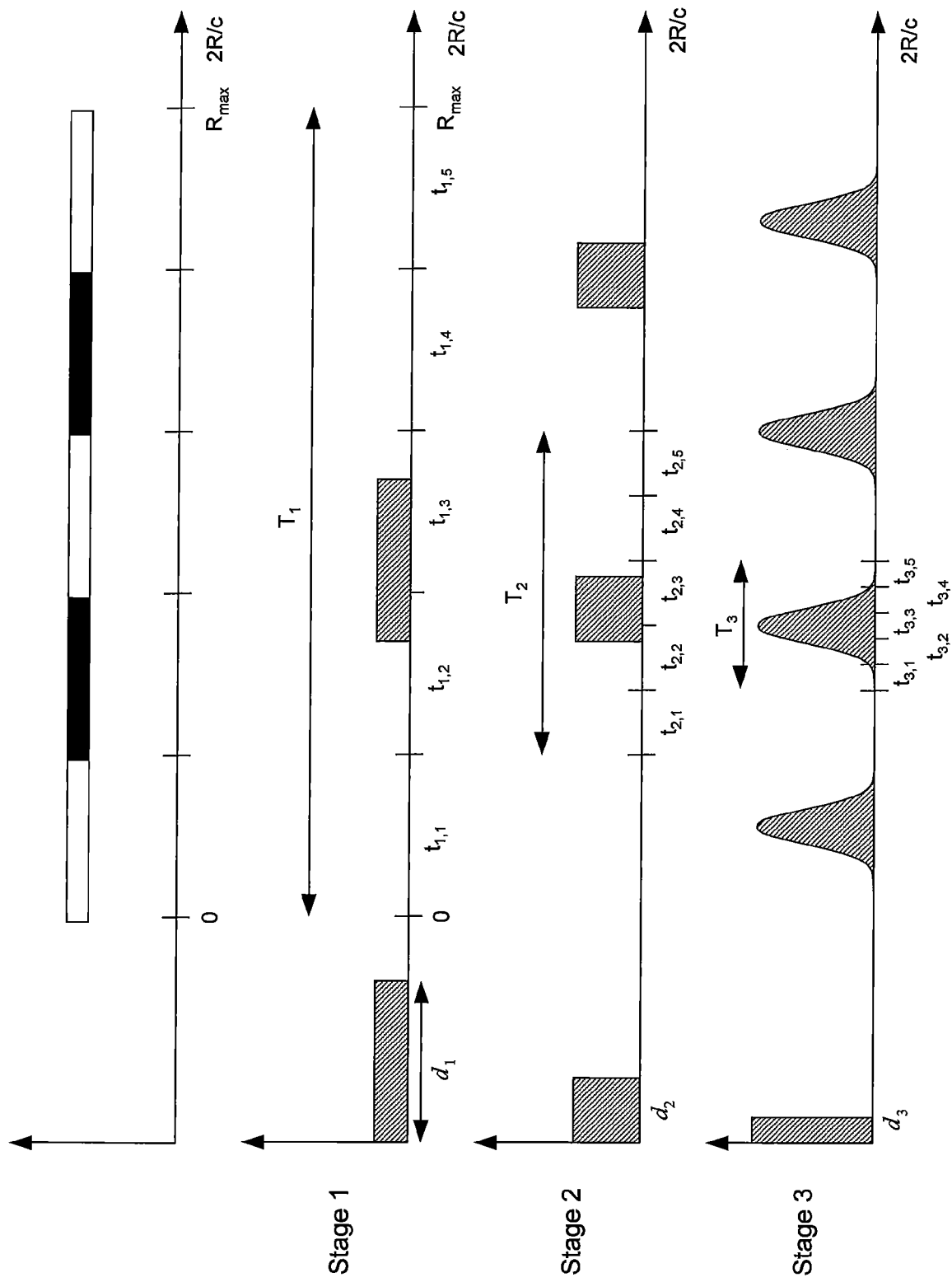

FIG. 6 is an explanatory diagram representing the choice of measuring intervals and part-intervals for a working example of a method according to the invention.

On emission of a multiplicity of light pulses to the target, detection of the light pulses scattered back by the target is effected in a plurality of stages and by means of a multiplicity of distance-measuring pixels, the distance to the target being derived for each of the pixels, in particular according to the pulse transit time principle. In order to avoid ambiguities in the reception of the light pulses, the repetition rate thereof and the time window for the reception must be tailored to one another so that, for a target present at a maximum distance $R_{max}$, only one light pulse can be registered within a measuring interval $T_1$. The initial choice of the measuring interval $T_1$ is therefore effected with compliance with this condition. If, however, the rough distance to the target is known, the time window for the measuring interval $T_1$ can be shortened and can be made more precise with respect to time.

Each measuring interval $T_1$ is divided into at least two, in particular equally long, part-intervals $t_{1,j}$, the emitted light pulse being tailored with respect to its duration $d_1$ to the subdivision of the measuring interval $T_1$ so that it can be detected by two of these part-intervals $t_{1,j}$. In this working example, the measuring interval $T_1$ is divided into five equally long part-intervals $t_{1,1}$ to $t_{1,5}$.

According to the invention, the detection is effected in at least two stages, the measuring interval $T_1$ being shortened from stage 1 to stage 2 or in the sequence of further stages, i.e. the detection having a detection step carried out with at least one repetition in at least two stages, the measuring interval $T_i$ being shortened from stage to stage. The measuring principle of the detection step is maintained over a plurality of stages and the detection step is repeated. The measuring interval used for the detection method is therefore successively shortened stage by stage with the same measuring principle.

For this purpose, in the case of detection of the front signal flank, the period from the part-interval $t_{1,3}$ with the highest detected light energy and the immediately preceding part-interval $t_{1,2}$ are chosen as shortened measuring interval $T_2$ for stage 2 from the measuring interval $T_1$ of the respective preceding stage 1. For the detection of the rear signal flank, the period from the part-interval $t_{1,max}$ with the highest detected light energy and the immediately following part-interval $t_{i,max+1}$ can be chosen as the shortened measuring interval $T_{i+1}$ from the measuring interval $T_i$ of the respective preceding stage i.

In addition, in stage 2, the maximum duration $d_2$ of the light pulses is adapted to the part-intervals $t_{2,j}$ by limiting them with respect to time by the duration of a part-interval $t_{2,j}$. Owing to the now roughly known position of the received signal as a function of time, the repetition rate of the light pulses can also be increased from stage to stage.

Stage 2 may also be followed by further stages with shortenings of the measuring intervals, which leads to progressively increasing accuracy in the determination of the position of the received light pulse as a function of time. In this diagram, once again the part-interval $t_{2,3}$ with the highest detected light energy is identified from the measuring interval $T_2$ for stage 3 and the period thereof, together with that of the immediately preceding part-intervals $t_{2,2}$, forms the shortened measuring interval $T_3$ of the third stage, in this third stage, too, the duration $d_3$ of the emitted light pulses, as well as the repetition rate thereof, being adapted. The detection is therefore effected in a plurality of stages, the measuring interval $T_i$ being shortened from stage to stage so that the measuring intervals $T_i$ of different stages overlap. Here, there is at least an overlap of the measuring intervals $T_i$ of successive stages, but in particular an overlap of all measuring intervals $T_i$, so that these have a common region in the relative position as a function of time, in which region the light pulse to be received is localised.

The embodiments and figures shown represent only explanatory examples for realisations according to the invention and are therefore not to be understood as being definitive and limiting. In particular, the numbers of pixels and distance points described or of the coordinated beam paths and memory cells or part-intervals have been chosen merely for illustrative reasons.

The invention claimed is:

1. A distance measuring method for determining the spatial dimension of at least one target, comprising:
   emitting a multiplicity of light pulses to the target;
   detecting light pulses scattered back by the target by means of a multiplicity of distance-measuring pixels; and
   deriving a distance to the target for each of the pixels, each light pulse being detected within a measuring interval $T_i$ comprising at least two part-intervals $t_{i,j}$, wherein the detection comprises a detection step carried out with at least one repetition in at least two stages, the measuring interval $T_i$ being shortened from stage to stage.

2. A method according to claim 1, wherein the light pulses are emitted by a laser and the distance to the target is derived by the pulse transit time principle.

3. A method according to claim 1, wherein the at least two part-intervals $t_{i,j}$ are equally long.

4. A method according to claim 1, wherein the period from the part-interval $t_{i,max}$ with the highest detected light energy and the immediately preceding part-interval $t_{1,max-1}$ or the immediately following part-interval $t_{i,max+1}$ is chosen as shortened measuring interval $T_{i+1}$ from the measuring interval $T_i$ of the respective preceding stage i.

5. A method according to claim 1, wherein the repetition rate of the light pulses is increased from stage to stage.

6. A method according to claim 1, wherein the maximum duration of the light pulses is adapted from stage to stage to the part-intervals $t_{i,j}$ and is limited with respect to time by the duration of a part-interval $t_{i,j}$.

7. A method according to claim 1, wherein distortions of the back-scattered light pulse caused by an excessively high signal level or background light are reduced with the use of a non linear model for the variation of the detected light pulse.

8. A method according to claim 7, wherein the non linear model for the variation of the detected light pulse is according to $$P_n = \exp\left(-\frac{1}{2}\frac{\eta_0 \cdot Q_r}{hv}\left[\text{erf}\left(\frac{t-\tau}{\sqrt{2}\cdot\sigma_p}\right)+1\right] - t\cdot\eta_0\cdot E\right)$$

as a function of:
   time t,
   lag time $\tau$,
   pulse energy $Q_r$,
   pulse length $\sigma_p$,
   intensity of the background light E,
   detection quantum efficiency $\eta_0$, and
   single-photon energy hv.

9. A method according to claim 8, wherein the lag time $\tau$ is determined from $P_n$ by solving a non linear optimization problem, in which:
   the pulse length $\sigma_p$ is determined by a system identification;
   the pulse energy $Q_r$ or $$\frac{\eta_0 \cdot Q_r}{h\nu}$$

is estimated together with the lag time τ; and the intensity of the background light E or $\eta_0 \cdot E$ is determined either by estimation or by a separate measurement.

10. A method according to claim 8, wherein, in the last stage, the light pulse to be detected is centered in the measuring interval in order to minimize errors of the estimated values of pulse length $\sigma_p$ and background light E or $\eta_0 \cdot E$ by interpolation in the last stage or by a subsequent measuring phase.

11. A rangefinder for determining the spatial dimension of at least one target, comprising:

a beam source for emitting a multiplicity of light pulses to the target;

an arrangement of distance-measuring pixels for detecting the light pulses scattered back by the target;

a control and a valuation component for deriving a distance to the target for each of the pixels according to the pulse transit time principle; and in each case at least two memory cells being coordinated with each pixel, which memory cells in each case determine a part-interval $t_{i,j}$, as a function of time so that a measuring interval $T_i$ is covered with respect to time, wherein the memory cells are connected so that the detection has a detection step carried out with at least one repetition in at least two stages, the measuring interval $T_i$ being shortened from stage to stage.

12. A rangefinder according to claim 11, wherein the pixels are formed as linear photodetectors as photogates, PIN diodes, or avalanche photodiodes.

13. A rangefinder according to claim 12, wherein the memory cells integrate, during the coordinated part-intervals $t_{i,j}$, the light intensity of the light pulses which is scattered back by the target.

14. A rangefinder according to claim 13, wherein the memory cells are formed as charge-transfer gates.

15. A rangefinder according to claim 11, wherein the pixels are in the form of single-photon detectors.

16. A rangefinder according to claim 15, wherein the memory cells are formed as digital counters.

17. A rangefinder according to claim 11, further comprising an imaging optical system whose optical receiving power is configured to automatically adapt to the distance to the target by means of an adjustable pupil setting in order to achieve, on average over all pixels, an optimized detectable radiation intensity.

18. A rangefinder according to claim 11, wherein the radiation source is formed in such a way that the light pulses are variable in pulse shape and/or duration.

19. A rangefinder according to claim 11, wherein the control and evaluation component is formed for determination of the position of a detected light pulse as a function of time by interpolation.

20. A rangefinder according to claim 11, further comprising an imaging optical system whose depth of focus is capable of being adapted to the distance to the target for minimizing crosstalk between the pixels.

21. A rangefinder according to claim 11, wherein a separate beam path for the emission and detection of the light pulses is coordinated with each pixel.

22. A rangefinder according to claim 21, wherein the separate beam path is coordinated by a beam splitter, a first micro lens array, and a second micro lens array.

* * * * *